United States Patent
Goyal

(10) Patent No.: US 8,621,581 B2
(45) Date of Patent: Dec. 31, 2013

(54) PROTECTING AUTHENTICATION INFORMATION OF USER APPLICATIONS WHEN ACCESS TO A USERS EMAIL ACCOUNT IS COMPROMISED

(75) Inventor: Sanyam Goyal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 31 days.

(21) Appl. No.: 13/357,625

(22) Filed: Jan. 25, 2012

(65) Prior Publication Data

US 2013/0191886 A1    Jul. 25, 2013

(51) Int. Cl.
*G06F 7/04* (2006.01)
*H04L 29/06* (2006.01)

(52) U.S. Cl.
USPC .................................. 726/5; 713/152; 709/14

(58) Field of Classification Search
USPC .................................. 726/5; 713/152; 709/14
See application file for complete search history.

(56) References Cited

U.S. PATENT DOCUMENTS

| | | | |
|---|---|---|---|
| 6,571,290 B2 * | 5/2003 | Selgas et al. | 709/228 |
| 6,640,301 B1 * | 10/2003 | Ng | 713/156 |
| 2007/0136573 A1 | 6/2007 | Steinberg | |
| 2008/0086646 A1 | 4/2008 | Pizano | |
| 2008/0307226 A1 | 12/2008 | Chow et al. | |
| 2009/0327714 A1 | 12/2009 | Yaghmour | |
| 2011/0185421 A1 | 7/2011 | Wittenstein et al. | |

OTHER PUBLICATIONS

Session Fixation, http://en.wikipedia.org/wiki/Session_fixation#Best_solution:_Identity, Downloaded circa Oct. 12, 2011, pp. 1-7.
Django, User authentication in Django, https://docs.djangoproject.com/en/dev/topics/auth/ Copyright 2005-2012, pp. 1-25.
Nick Nikiforakis, Wannes Meert, Yves Younan, Martin Johns, and Wouter Joosen "SessionShield: Lightweight Protection against Session Hijacking" IBBT-DistriNet, http://polyboy.net/docs/2011_ES-SoS_SShield.pdf Downloaded circa Feb. 7, 2012, p. 1-14.

* cited by examiner

*Primary Examiner* — Techane Gergiso
(74) *Attorney, Agent, or Firm* — Narendra Reddy Thappeta

(57) ABSTRACT

An email server provided according to an aspect of the present invention protects authentication information of user applications when access user's email account is compromised. In an embodiment, when an email message directed to a user contains content which provides access to authentication information for accessing a user application implemented external to said email server, the email server requires authentication credentials from the user before providing access to the content. As a result, even if the user's email account is compromised, additional controls are provided to reduce the probability of compromise of access to user applications implemented external to the email server.

20 Claims, 5 Drawing Sheets

PROTECTING AUTHENTICATION INFORMATION OF USER APPLICATIONS WHEN ACCESS TO A USERS EMAIL ACCOUNT IS COMPROMISED

BACKGROUND OF THE INVENTION

1. Technical Field

The present disclosure relates to information security, and more specifically to protecting authentication information of other user applications when access to a user's email account is compromised.

2. Related Art

Electronic mail (Email) is used for asynchronous communication between users. Each user uses a client system with an appropriate software to compose and send email messages to various recipients of interest at times convenient to the sending user. Each recipient (user) has an associated email server, which provides access to all the email messages received for the corresponding recipient at a time convenient for the recipient.

Each email server typically serves several users, and each user is accordingly said to have an account with the email server. Each account is uniquely identified by a user name within a domain served by the email server. In combination with a domain identifier, the user is uniquely identified globally for any sender to send an email to the user as the corresponding recipient. For example, an email identifier of goodbeing@gmail.com globally identifies the corresponding user, with gmail.com representing the domain name identifier and good being representing the user name within the domain.

Email accounts are often used by users in managing authentication information for several user applications provided by other parties. In a typical use case, a user with an online account with Citibank may specify goodbeing@gmail.com as being a related email account, and the Citibank servers may thereafter use that account in managing authentication information for accessing the Citibank servers. For example, if a user wishes to reset the authentication information (for accessing user information on Citibank servers), the Citibank servers may send an email to goodbeing@gmail.com that facilitates the authentication information (e.g., password) to be reset. Alternatively, some authentication servers send the then existing password for the user to that email identifier.

Thus, associating email accounts with user applications provides the convenience of managing the authentication information (in addition to possibly sharing of monthly account statements, etc.), which is legitimately required in several situations, particularly given that a user may forget (or otherwise irretrievably misplace) the authentication information.

There are often situations in which a user's email account is compromised. A compromise is said to occur when an unknown party can control a user's session, without the user's permission or knowledge. Typical situations in which such a compromise can occur include a hacker somehow deciphering the user identifier/password combination, by stealing cookies related to valid sessions a user had earlier properly setup, user forgetting to logout of a public terminal and the hacker thereafter continuing using the session from such a terminal, etc.

While having email accounts specified associated with user application serves several legitimate requirements as noted above, such association can be problematic when a user's email account is compromised. For example, a hacker who is in control (without the user the knowledge or permission) of the email account may be able to easily ascertain the account identifiers at various user applications (e.g., accounts at other banks, brokerages, travel web sites, etc.) using the various logs maintained at the email account, and attempt to change/ascertain the authentication information of such user applications.

It is therefore desirable that the authentication information (of users) enabling access to user applications be protected at least in some of the situations noted above.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An email server provided according to an aspect of the present invention protects authentication information of user applications when access to user's email account is compromised. In an embodiment, when an email message directed to a user contains content which provides access to authentication information for accessing a user application, the email server requires authentication credentials from the user before the user can view the content of that email message. As a result, even if the user's email account is compromised, additional controls are provided to reduce the probability of compromise of access to user applications implemented external to the email server.

According to another aspect of the present invention, an authentication server associated with the user application includes additional data in an email message to indicate that the email contains content which provides access to authentication information for accessing a user application. An email server requires user credentials before permitting a user to view the content of the email message.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
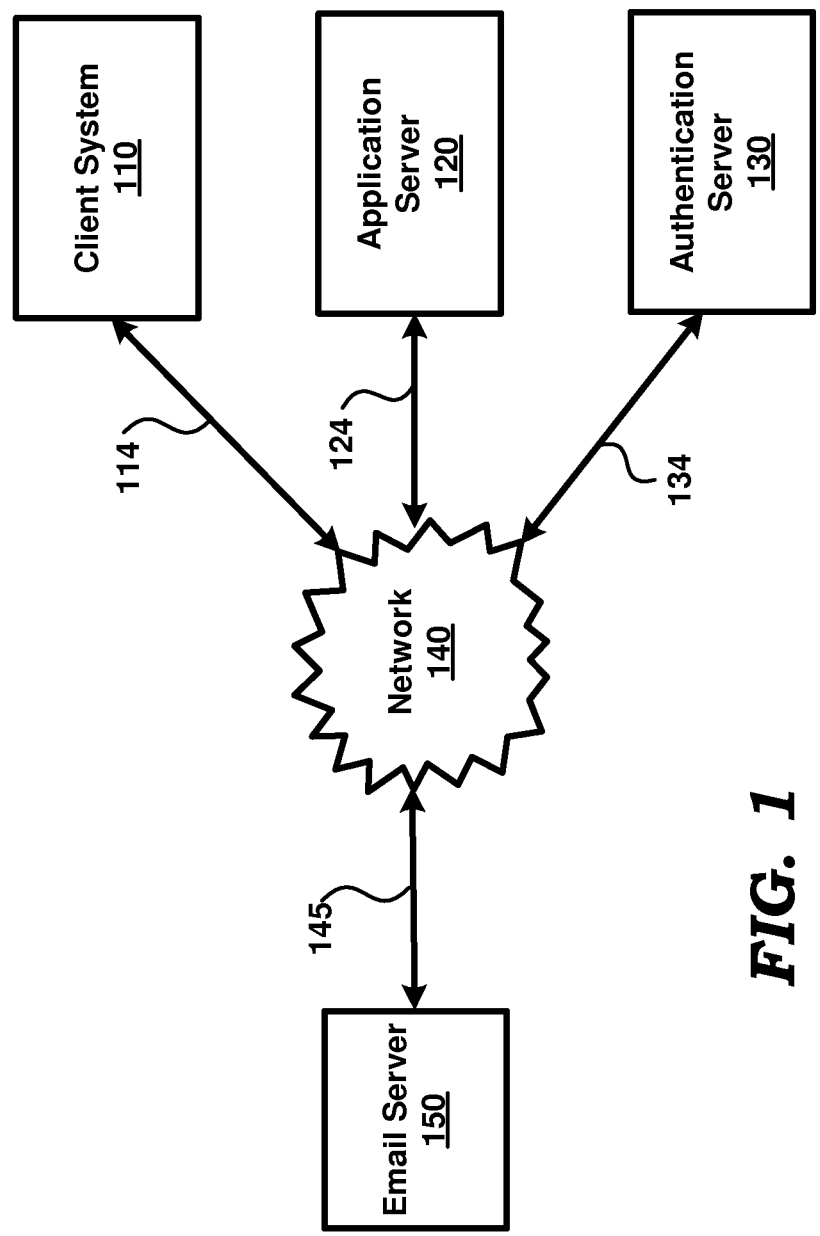
FIG. 1 is a block diagram illustrating an example environment in which several aspects of the present invention can be implemented.

FIG. 1 is a block diagram illustrating an example environment in which several aspects of the present invention can be implemented. The diagram is shown containing client system 110, application server 120, authentication server 130, network 140 and email server 150. Merely for illustration, only representative number/type of devices and systems are shown in FIG. 1. Many environments often contain many more systems, both in number and type, depending on the purpose for which the environment is designed. Each block of FIG. 1 is described below in further detail.

Network 140 provides connectivity between application server 120, authentication server 130, email server 150 and client system 110. Network 140 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. A (IP) packet is said to be directed to a target system when the destination IP address of the packet is set to the (IP) address of the target system, such that the packet is eventually delivered to the target system by network 140. When the packet contains content such as port numbers, which specifies the target application, the packet may be said to be directed to such application as well. Similarly, in case of email application, an email message is said to be directed to the user, when the corresponding email identifier is specified in the header of the email message. Network 140 may be implemented using any combination of wire-based or wireless mediums.

Client system 110 sends and receives emails via email server 150 using protocols such as SMTP, iMAP, etc., well known in the relevant arts. Email server 150 may accordingly be configured as an incoming/outgoing mail server. Similarly, client system 110 enables users to access various user applications (e.g., bank accounts, travel websites, etc.) using an appropriate interface. To facilitate access to such user applications and email servers, software such as browsers may be executed on client system 110, which send and receive packets on path 114. To facilitate access to emails, an email application (e.g., Outlook Express from Microsoft Corporation) may also be executed on client system 110. Each client system may correspond to a personal computer system, tablet system, mobile phone, work station, etc., as will be apparent to one skilled in the relevant arts by reading the disclosure herein.

Email server 150 receives email messages from various other servers (not shown) via network 140, and stores the messages until accessed by the respective recipients (from corresponding client systems). Access may be facilitated using browser software and/or email client software such as Outlook Express executing on the client systems, as noted above. Each such recipient is assigned a unique email identifier and the recipient is said to have an account on the email server. Email server 150 may also serve as an outgoing email server for the user wish such an account.

Application server 120 executes user applications, which process requests received from client systems and generate corresponding responses. Each user application is assumed to process requests received only from authenticated users. Many application servers may together implement multiple user applications and provide for single sign-on type authentication feature, well known in the relevant arts.

Authentication server 130 authenticates users before the users are able to send requests for processing by corresponding application servers. Authentication server 130 may be integrated within application server 120 as a single hardware unit, and authentication can be based on simple user identifier and password combination. To facilitate authentication, each user may be assigned a corresponding user identifier for the application(s) executing on application server 120. A password, typically specified by the user, is associated with each user identifier for the user to authenticate him/herself.

Authentication server 130 may also enable each user to specify a corresponding email identifier to be used for management of authentication information. For illustration, it is assumed that such email identifiers correspond to accounts on email server 150. Accordingly, when a user wishes to manage authentication information (e.g., change of user identifier or password) for one or more user applications executing on application server 120, authentication server 130 sends an email message with content, which provides access to authentication information for accessing the user applications. The user identifier password combination may be sent, or alternatively a URL may be sent in the content, which when clicked on, enables the user to reset the password to a desired string. Thus, the user can continue accessing the user application with that password thereafter.

However, as noted above in the background section, if the email account at email server 150 is compromised, the unauthorized user (i.e., person controlling the email account, without permission or knowledge of the user) may be able to access the user account on application server 120 as well, by attempting tasks such as password reset, explained above. The unauthorized user can thereafter misuse the user application (e.g., transfer money to another account, purchase tickets using the user's credit cards, etc.). It is generally desirable that the user be protected against such undesirable compromise at user applications provided on application server 120.

As described below with examples, several aspects of the present invention address at least some of the requirements and/or problems noted above.

Figure 2:
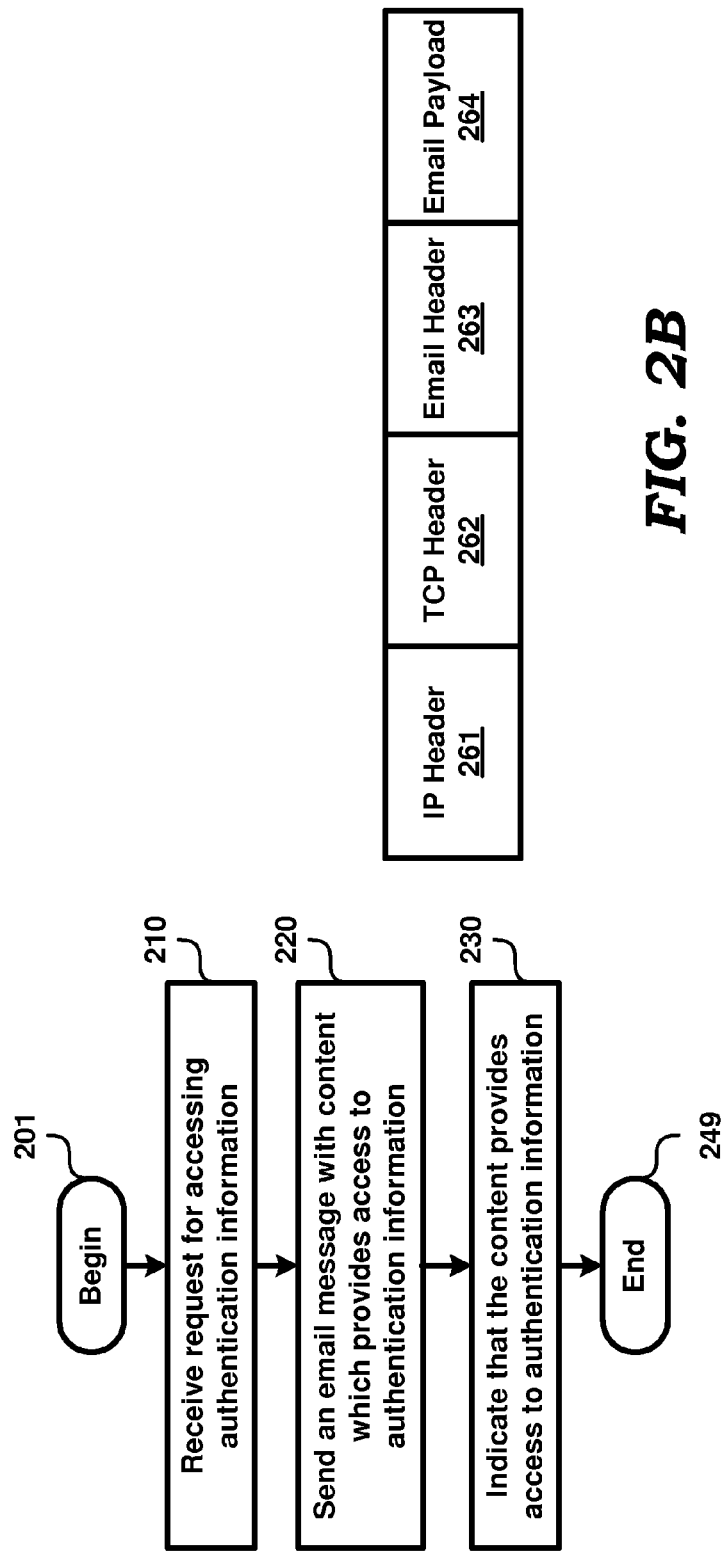
FIG. 2A is a flowchart illustrating the manner in which an authentication server operates to protect authentication information of users, in an embodiment of the present invention.
FIG. 2B depicts a packet format used by an authentication server to communicate the presence of authentication information in a packet.

3. Authentication Server: Protecting Authentication Information for User Applications FIG. 2A is a flowchart illustrating the manner in which authentication server 130 operates to protect authentication information of user applications, in an embodiment of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, authentication server 130 receives a request from a user for accessing authentication information. Access includes both mere viewing and changing (e.g., password reset operation). In general, users are permitted to make such requests only after appropriate authentication (e.g., user identifier password combination and additional information such as answers to some questions). The request may be received in the form of a packet on path 134, and the specific user may be identified based on the user identifier (at the corresponding user application) specified by the user in requesting the information. Control then passes to 220.

In step 220, authentication server 130 processes the request and sends an email message with content which provides access to authentication information. As an illustration, the content may contain the text representing the password and/or user identifier for that user application. Alternatively, the content may specify a URL, which when selected, enables the user to change/reset the password. The URL may point to authentication server 130, such that the user may be prompted for the new password (by authentication server 130), when the user selects the URL.

In step 230, authentication server 130 further indicates that the content provides access to authentication information. The indication is in addition to the content of step 220. In an embodiment, the indication is included within the email message of step 220. The email message is sent to the email identifier specified by the user associated with the user application (or the identity of the user), and thus delivered to email server 150. Various approaches can thus be used to send the indication and content, as will be apparent to one skilled in the relevant arts. An example packet format illustrating one such approach is depicted in FIG. 2B.

FIG. 2B depicts a packet format consistent with RFC 5322 ("Internet Message Format" by Ed P Resnick) for the email message in an embodiment. As is well known in the relevant arts, an IP packet contains IP header 261 (indicating the destination/source addresses and that the rest of the packet is according to TCP), TCP header 262 (with port numbers, confirming that this is an email message), email header 263 and email payload 264.

Email header 263 may be defined, for example as specified in "3.6.8. Optional Fields" of RFC 5322, to include an additional field SECURE-INFO, which is set by default to false. When set to true, the optional field indicates that payload 264 contains the information of step 220 described above. Payload 264 can be in encrypted or unencrypted format when SECURE-INFO is set to true, according to any pre-specified convention. In case payload 264 is in encrypted format, email server 150 is provided the ability to decrypt (e.g., using PKI type approaches, with email server 150 having the corresponding private key for decryption).

Thus, authentication server 130 may send content which provides access to authentication information using messages, for example, consistent with FIG. 2B. The manner in which email server 150 may thereafter operate, is described below with respect to FIG. 3.

4. Email Server: Protecting Authentication Information for User Application

Figure 3:
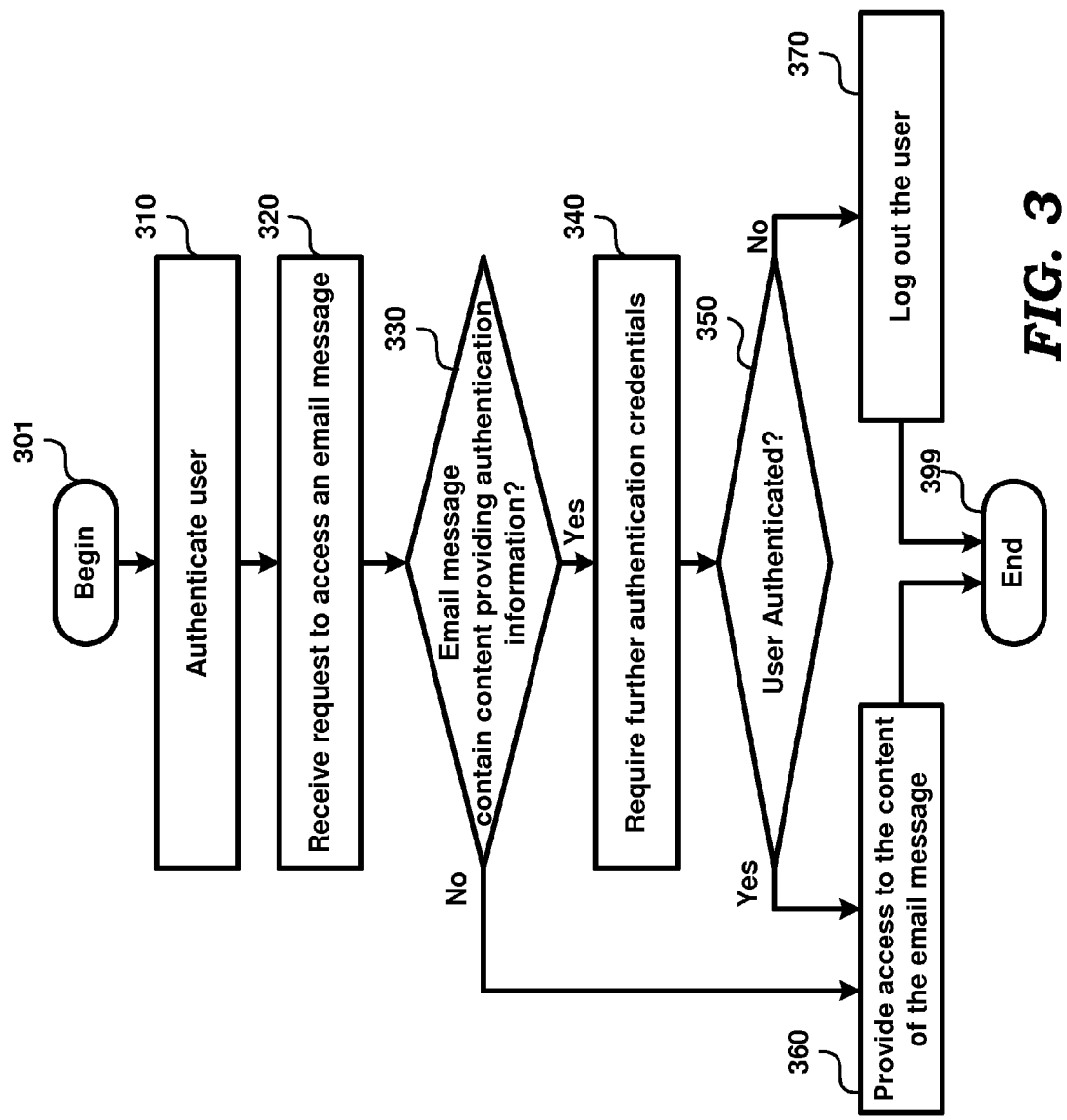
FIG. 3 is a flowchart illustrating the manner in which an email server operates to protect authentication information of users, in an embodiment of the present invention.

FIG. 3 is a flowchart illustrating the manner in which email server 150 protects authentication information for user applications in an embodiment. The flowchart is described with respect to FIGS. 1 and 2A merely for illustration. However, many of the features can be implemented in other environments also without departing from the scope and spirit of several aspects of the present invention, as will be apparent to one skilled in the relevant arts by reading the disclosure provided herein. The flow chart begins in step 301, in which control immediately passes to step 310.

In step 310, email server 150 authenticates a user, for example, based on packets received from client system 110.

Such authentication may be one that is performed in normal course before the user is provided the ability to access the email messages received from other users, and stored associated with the email account of the user. In one embodiment, the user is requested to provide the combination of email identifier and a corresponding password for authentication. An authentication server that is local to the enterprise that provides email server 150 may be used for authentication. Control then passes to step 320.

In step 320, email server 150 receives request from client system 110 to access an email message. Such a request may be a request to access a single email message (e.g., in case of accessing via a browser) or part of a batch request (in case of attempts to download all emails sequentially in a batch).

In step 330, email server 150 determines whether the email message contains content providing access to authentication information. Such determination can be based on examination of email header 263, described above with respect to FIG. 2B. However, if authentication server 130 does not support the optional header described there (i.e., if the SECURE-INFO optional field itself is absent in the header), email server 150 may instead parse the content (e.g., for words such as password, which would indicate that the email message has such content) to determine if the message contains content which provides access to authentication information. In general, any suitable approach may be employed for such determination. Control passes to step 340 if the email message is determined to contain content providing access to authentication information, and to step 360 otherwise.

In step 340, email server 150 requires further authentication credentials from the user before providing access to the content of the email message. Such authentication credentials can be the same ones as those in step 310, or they can be different. For example, in addition to the email identifier-password combination, email server 150 may have earlier recorded answers to a few favorite questions of the user, and the same questions may be posed (and the received answers compared with the pre-recorded answers) to further confirm the identity of the user at client system 110 from which the request for accessing the email message are being received. Alternative techniques requiring more stringent authentication (e.g., based on biometrics) can also be employed.

In step 350, email server 150 determines whether the user is authenticated based on the information provided/received in step 340. Control passes to step 360 if the user is considered to be authenticated, and to step 370 otherwise. In step 370, the user is logged out as a precautionary measure, since the user is deemed to not have been authenticated in step 350. Thus, the user is denied access to the email message containing the authentication information, thereby protecting the authentication information of user applications on application server 120.

In step 360, email server 150 provides access to the content of the email message. Thus, a packet containing the email message (field 264 and possibly 263 also entirely including the optional field) is sent to client system 110 as a response to the request of step 320. The flow chart ends in step 399.

Thus, in accordance with the approach of FIG. 3, the user is able to view content providing access to authentication information only after further establishing the credentials on email server 150. Assuming the hacker has merely taken control of an active session (e.g., by stealing cookies or continuing a session, which has not been logged out inadvertently by the legitimate user), compromise of authentication information related to user applications is avoided. As is well known in the relevant arts, a session refers to an active connection established and used between two end points to an application. Such a session can be based on a web browser (e.g., Internet Explorer software product from Microsoft Corporation) or email client (Outlook Express software product, also from Microsoft Corporation).

In case the hacker has deciphered the authentication information of the user at email server 150, requiring additional information (e.g., answers to questions, as described above) may provide additional safeguard at least for some time, with respect to protecting the authentication information related to user applications at application server 120.

The features described above can be implemented in various embodiments of email server 150. The description is continued with respect to the details of an example embodiment of email server 150.

5. Example Implementation

Figure 4:
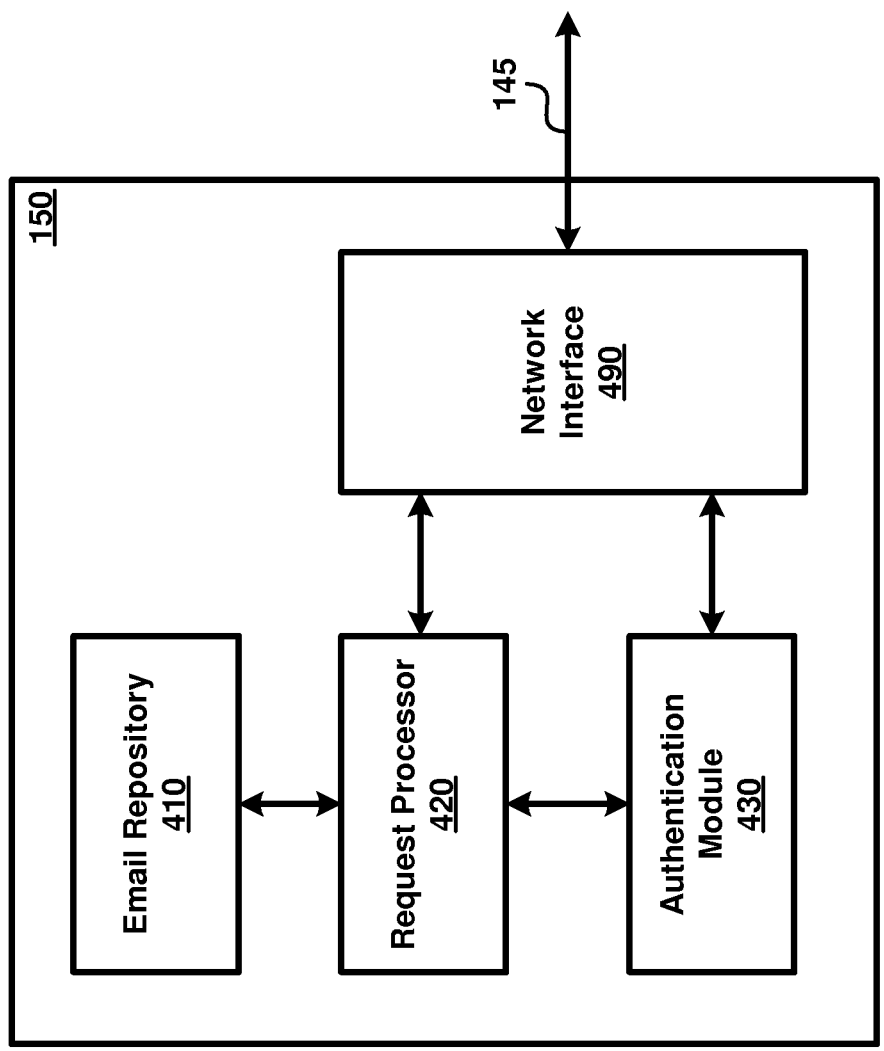
FIG. 4 is a block diagram illustrating the details of an email server in an embodiment.

FIG. 4 is block diagram illustrating the details of implementation of email server 150 in one embodiment. Email server system 150 is shown containing email repository 410, request processor 420, authentication module 430, and network interface 490.

Network interface 490 provides the physical, electrical and protocol interfaces to enable server system 150 to send and receive IP packets on path 145. Multiple packets may be received associated with processing a single email request (e.g., of step 320) in supporting the transport layer functions, etc. The packets form the basis for receiving of email messages for various users and also for processing requests to access stored emails, in accordance with FIG. 3.

Email repository 410 represents a non-volatile storage to store the email messages received from other email servers for users having accounts at email server 150. The email messages may be stored until the corresponding user deletes the messages, typically after viewing. Though shown provided internal to email server 150 (in the form of a secondary storage), email repository can be alternatively provided as an external unit, for example, as a database system (not shown).

Authentication module 430 authenticates the user credentials received from client system 110, in case of both steps 310 and 340 described above. Authentication module 430 may forcibly logout a user in case of repeated (e.g., 3 times) presentation of invalid credentials. Authentication module 430 stores valid corresponding credentials in a non-volatile memory and thereafter compares the credentials received via network interface 490 with respective stored data (for the same email identifier/user), in authenticating a user. Though shown internal to email server 150, external authentication servers (not shown) provided by the same enterprise as that providing email server 150, can be used for authentication of users.

Request processor 420 stores in email repository 410 email messages received from other email servers (not shown) and directed to specific users served by email server 150. Each user may be permitted access to emails stored associated with the corresponding user account, in accordance with the approaches described above with respect to FIG. 3. A user may thus view the email messages and then delete specific desired ones from email repository.

Thus, email server 150 operates to protect authentication information of user applications provided on external servers such as application server 120. The description is continued with respect to a digital processing system in which several features are operative when the corresponding executable modules are executed.

6. Digital Processing System

Figure 5:
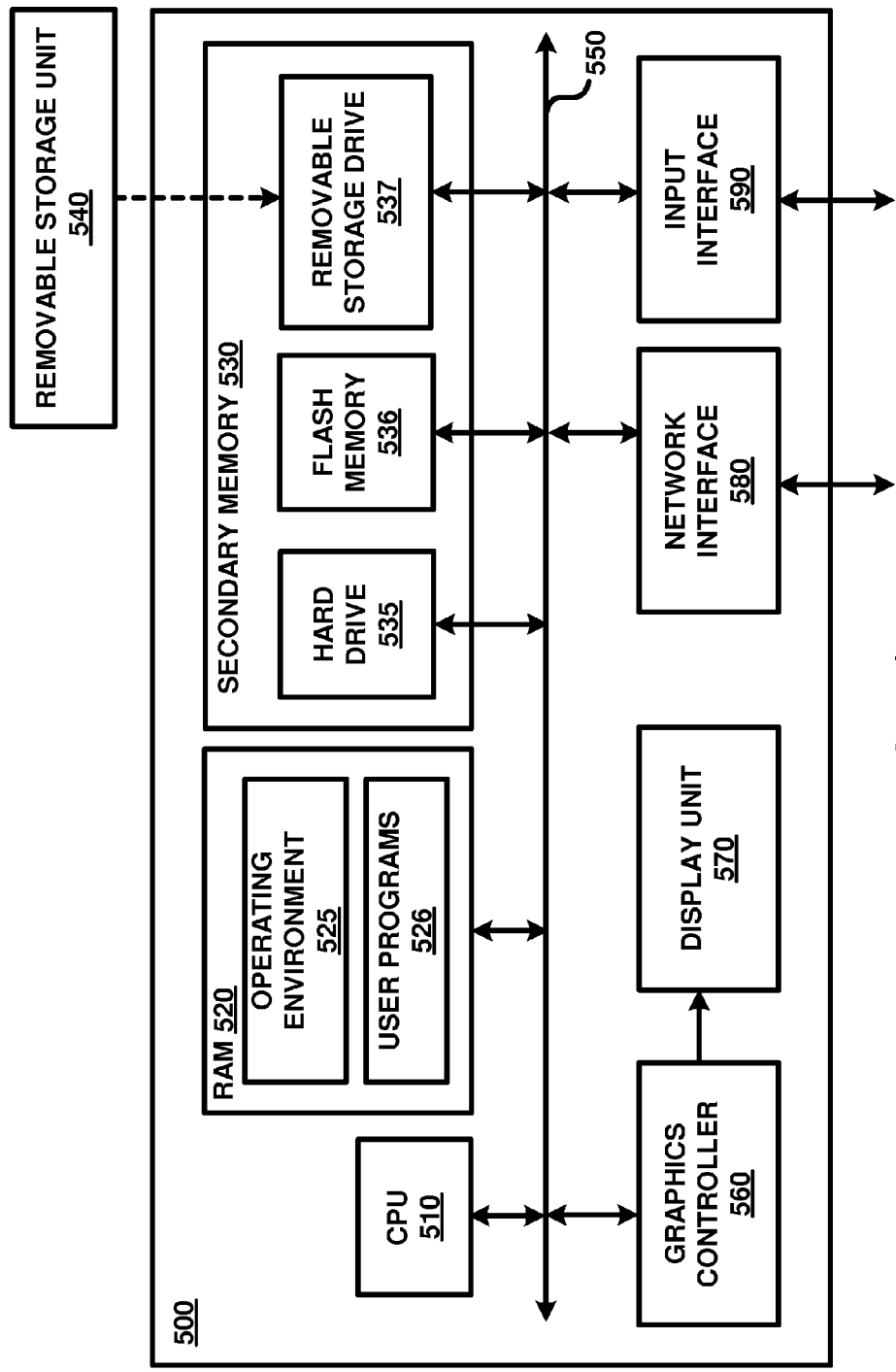
FIG. 5 is a block diagram illustrating the details of a digital processing system in which several aspects of the present invention are operative by execution of appropriate software instructions.

FIG. 5 is a block diagram illustrating the details of digital processing system 500 in which various aspects of the present invention are operative by execution of appropriate executable modules. Digital processing system 500 may correspond to email server 150 or authentication server 130. Digital processing system 500 may contain one or more processors (such as a central processing unit (CPU) 510), random access memory (RAM) 520, secondary memory 530, graphics controller 560, display unit 570, network interface 580, and input/output interface 590. All the components except display unit 570 may communicate with each other over communication path 550, which may contain several buses as is well known in the relevant arts.

CPU 510 may execute instructions stored in RAM 520 to provide several features (e.g., the features described with respect to FIG. 2A/2B in case of authentication server 130 and the features described with respect to FIGS. 3 and 4 in case of email server 150) of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and/or user programs 526 (which include request processor 420 and authentication module 430 in when system 500 represents email server 150). Shared environment 525 contains utilities shared by user programs, and such shared utilities include operating system, device drivers, etc., which provide a (common) run-time environment for execution of user programs/applications.

Graphics controller 560 generates display signals (e.g., in RGB format) to display unit 570 based on data/instructions received from CPU 510. Display unit 570 contains a display screen to display the images defined by the display signals. Input/output interface 590 includes input as well as output devices to enable a user to interact with system 500, and thus provides the basis for user interface 390 as well. Network interface 580 corresponds to network interface 490 when system 500 corresponds to email server 150.

Secondary memory 530 (representing a non-transitory storage/medium) may contain hard drive 535, flash memory 536, and removable storage drive 537. Secondary memory 530 may store data (e.g., email repository 410 in case of email server 150) and software instructions (for example, for performing the steps of FIG. 2 in case of authentication server 130 and those of FIG. 3 in case of email server 150), which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 530. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of processing email messages in an email server, said method comprising:
   receiving an email message directed to a user, said email message containing content which provides access to a first authentication information for accessing a user application implemented external to said email server, wherein users are required to be authenticated to access said user application, wherein said first authentication information enables said user to be authenticated for accessing said user application;
   authenticating said user based on a second authentication information received from said user, wherein said user is permitted to access email messages in said email server upon said authenticating;
   receiving, after said authenticating, a first request to access said email message from said user; and
   in response to said first request from said user, said email server requiring said user to provide further authentication credentials before permitting said user to view said content, in view of said content providing access to said first authentication information for accessing said user application,
   wherein said further authentication credentials operate to further authenticate said user before permitting said user to view said content of said email message.

2. The method of claim 1, further comprising:
   examining said email message to determine whether said first authentication information is contained in said email message, wherein said requiring is performed only if said email message is determined to contain said first authentication information.

3. The method of claim 2, wherein said email message contains a header and a payload, said payload containing said content, said header containing a field indicating that said content provides access to said first authentication information,
   wherein said examining examines said header of said email message for the presence of said field in said header to determine whether said first authentication information is contained in said email message.

4. The method of claim 3, wherein said authenticating comprises receiving an email identifier and password combination from a client system, and comparing with corresponding pre-stored valid information to authenticate said user.

5. The method of claim 4, wherein said requiring comprises receiving an email identifier and password combination from said client system, and comparing with corresponding pre-stored valid information, such that the same authentication approach is used by both said authenticating and said requiring.

6. The method of claim 5, wherein said requiring protects said authentication information in said email message against compromise of a session of said user.

7. The method of claim 4, wherein said requiring comprises requesting said user for information in addition to said email identifier and password combination, whereby said requiring protects said authentication information against compromise of said password of said user.

8. A non-transitory computer readable medium storing one or more sequences of instructions, wherein execution of said one or more sequences of instructions by one or more processors contained in a email server causes said email server to process email messages, wherein execution of said one or more instructions by one or more processors contained in said email server causes said email server to perform the actions of:
   receiving an email message directed to a user, said email message containing content which provides access to a first authentication information for accessing a user application implemented external to said email server, wherein users are required to be authenticated to access said user application, wherein said first authentication information enables said user to be authenticated for accessing said user application;
   authenticating said user based on a second authentication information received from said user, wherein said user is permitted to access email messages in said email server upon said authenticating;
   receiving, after said authenticating, a first request to access said email message from said user; and
   in response to said first request from said user, said email server requiring said user to provide further authentication credentials before permitting said user to view said content, in view of said content providing access to said first authentication information for accessing said user application,
wherein said further authentication credentials operate to further authenticate said user before permitting said user to view said content of said email message.

9. The computer readable medium of claim 8, further comprising:
examining said email message to determine whether said first authentication information is contained in said email message, wherein said requiring is performed only if said email message is determined to contain said first authentication information.

10. The computer readable medium of claim 9, wherein said email message contains a header and a payload, said payload containing said content, said header containing a field indicating that said content provides access to said first authentication information,
wherein said examining examines said header of said email message for the presence of said field in said header to determined whether said first authentication information is contained in said email message.

11. The computer readable medium of claim 10, wherein said authenticating comprises receiving an email identifier and password combination from a client system, and comparing with corresponding pre-stored valid information to authenticate said user.

12. The computer readable medium of claim 11, wherein said requiring comprises receiving an email identifier and password combination from said client system, and comparing with corresponding pre-stored valid information, such that the same authentication approach is used by both said authenticating and said requiring.

13. The computer readable medium of claim 12, wherein said requiring protects said authentication information in said email message against compromise of a session of said user.

14. The computer readable medium of claim 11, wherein said requiring comprises requesting said user for information in addition to said email identifier and password combination, whereby said requiring protects said authentication information against compromise of said password of said user.

15. A computing system comprising:
an authentication server to send an email message containing a first content which provides access to a first authentication information required by a user for accessing a user application, said authentication server further including additional content in said email message to indicate that said email message contains said first content providing access to said first authentication information; and
an email server to receive said email message for delivery to said user, said email server operable to:
authenticate said user based on a second authentication information received from said user, wherein said user is permitted to access email messages in said email server upon said authenticate;
receive, after said authenticate, a first request to access said email message from said user; and
in response to said first request and said additional content, said email server to require said user to provide further authentication credentials before permitting said user to view said first content of said email message,
wherein said further authentication credentials operate to further authenticate said user before permitting said user to view said first content of said email message,
wherein at least one of said authentication server and said email server contains a processor and a memory, said processor to retrieve instructions from said memory and execute the retrieved instructions.

16. The computing system of claim 15, wherein said email server is operable to:
examining said email message to determine whether said additional content is contained in said email message, wherein said email server requires said further authentication credentials only if said email message is determined to contain said additional content.

17. The computing system of claim 15, wherein said authentication server sends a packet representing said email message in response to said user requesting reset of said first authentication information,
said authentication server forming said packet to contain an address of said email server in a destination field of said packet in response to said user having configured an email identifier as being associated with said user, said email identifier specifying said email server in a domain name portion of said email identifier,
said first content further providing an URL, which when selected enables said user to reset said first authentication information.

18. The computing system of claim 15, wherein said email message contains text representing a password of said user.

19. The computing system of claim 15, wherein said authentication server is provided within a application server as a single unit, wherein said application server provides said user application based on execution of corresponding software instructions, wherein said first authentication information comprise a user identifier and a password only.

20. The computing system of claim 15, wherein said additional content is included as a header field in said email message.

* * * * *

UNITED STATES PATENT AND TRADEMARK OFFICE
CERTIFICATE OF CORRECTION

PATENT NO.        : 8,621,581 B2                                   Page 1 of 1
APPLICATION NO.   : 13/357625
DATED             : December 31, 2013
INVENTOR(S)       : Goyal It is certified that error appears in the above-identified patent and that said Letters Patent is hereby corrected as shown below:

On title page, under title, and in the Specification, column 1, line 3, delete "USERS" and insert -- USER'S --, therefor.

In the Claims

In column 11, line 21, delete "determined" and insert -- determine --, therefor.

Signed and Sealed this
Thirtieth Day of June, 2015

Michelle K. Lee
*Director of the United States Patent and Trademark Office*